United States Patent [19]
Waldner, Jr.

[11] Patent Number: 5,927,384
[45] Date of Patent: Jul. 27, 1999

[54] APPARATUS AND METHOD FOR CONTROLLING THE OPERATING TEMPERATURE OF LUBRICANTS

[76] Inventor: Craig M. Waldner, Jr., 3974 Rhoads Rd., Kempton, Pa. 19529

[21] Appl. No.: 08/847,878

[22] Filed: Apr. 28, 1997

[51] Int. Cl.⁶ .................................................. F24H 3/00
[52] U.S. Cl. .............................. 165/47; 165/44; 165/121; 165/122; 74/606 A; 184/104.1; 184/104.2; 184/104.3
[58] Field of Search ................................ 165/44, 47, 121, 165/122; 74/606 A; 184/104.1, 104.2, 104.3

[56] References Cited

U.S. PATENT DOCUMENTS

| | | | |
|---|---|---|---|
| 1,327,080 | 1/1920 | Brown . | |
| 1,564,742 | 12/1925 | Acker . | |
| 1,996,502 | 4/1935 | Brown | 180/339 |
| 2,250,382 | 7/1941 | Klavik . | |
| 2,325,647 | 9/1943 | Adamson | 74/606 |
| 2,391,186 | 12/1945 | Noble | 74/606 |
| 2,469,259 | 2/1949 | Burgess | 62/129 |
| 2,511,479 | 6/1950 | Olah | 74/606 |
| 2,548,805 | 4/1951 | Moir et al. | 74/606 |
| 2,714,824 | 8/1955 | Schmitter | 74/606 |
| 3,045,430 | 7/1962 | Becker . | |
| 3,353,591 | 11/1967 | Zak | 165/47 |
| 4,074,590 | 2/1978 | Jorg | 165/122 |
| 4,493,677 | 1/1985 | Ikenoya | 474/93 |
| 4,778,000 | 10/1988 | Maas | 165/47 |
| 4,872,502 | 10/1989 | Holzman | 165/47 |
| 4,878,467 | 11/1989 | Schmidt | 123/195 C |
| 4,915,192 | 4/1990 | Hayashida et al. | 165/41 |
| 5,316,106 | 5/1994 | Baedke et al. | 184/6.12 |
| 5,540,300 | 7/1996 | Downs et al. | 184/11.2 |

*Primary Examiner*—Ira S. Lazarus
*Assistant Examiner*—Terrell McKinnon
*Attorney, Agent, or Firm*—Harold I. Masteller, Jr.

[57] ABSTRACT

The invention is directed to apparatus and a method for controlling temperature of lubricant contained in, but not limited to, a differential housing. The apparatus includes a cover plate having an air duct arrangement that includes an intake manifold, a discharge and at least one air conduit that extends between the intake manifold and the discharge. The air conduit communicates with the outside surface of the cover plate, and a temperature responsive fan selectively forces air into the manifold to create an airflow along the air conduit. Heat is transferred from the cover plate surface to the air as the airflow moves through the air conduit and the heated air is expelled at the discharge to lower and control lubricant temperature.

48 Claims, 5 Drawing Sheets

APPARATUS AND METHOD FOR CONTROLLING THE OPERATING TEMPERATURE OF LUBRICANTS

BACKGROUND OF THE INVENTION

The present invention relates to cooling apparatus for controlling the operating temperature of lubricants, and in particular, it is directed to controlling the operating temperature of a gear lubricant contained in an automotive differential by providing a differential cover plate having an air duct arrangement includes means to selectively force a stream of cooling air across the surface of the differential cover plate to remove heat therefrom and thereby reduce the operating temperature of the gear lubricant contained within the differential housing.

It is well known that under certain load conditions the operating temperature of automotive lubricants and motor oils can be raised to temperature levels where they lose their viscosity. Hot, thinned gear lubricants and motor oils fail to provide adequate lubrication when they loose their viscosity. This can cause premature wear and/or damage to gears and engine parts, and it reduces the service life of components in both the engine and power train of the vehicle. This is especially true in a 4-wheel drive vehicle that is driven at either very fast highway speeds, or on extremely rough off-road conditions. Such high speed travel and/or heavy off-road conditions produce high operating temperatures in the differentials of 4-wheel drive vehicles, and the high gear lubricant temperature results in premature gear wear and failure.

The above described problem of high lubricant temperatures is not limited to 4-wheel drive vehicles. For example, high temperature problems are also experienced in recreational vehicles, including motor homes of all sizes, as well as any vehicle that tows a load ranging from a small boat to utility trailers and campers of all sizes and weights. The large size and mass of recreational vehicles, and the additional weight of a tow, impose loads on drive train components that produce high lubricant temperatures.

High operating temperatures are also a problem for high performance vehicles such as race cars. These vehicles are driven at sustained high speeds over long periods of time, and they often breakdown during a race due to mechanical failures caused by very high racing temperatures that cause lubricant failure.

Various attempts to overcome such high temperature problems are well documented in earlier patents. For example. United States patents granted to Downs, et al., Baedke, et al. and Hayashida, et al., teach various means for lowering the operating temperature of gear lubricant contained within an automotive differential. The Hayashida patent teaches using an air cooled heat exchanger to lower the operating temperature of a differential lubricant. The inventors disclose an automotive differential that includes a remote oil cooler and an air duct for directing air across the oil cooler. The cooling airflow is generated by, and dependent upon the speed of forward motion of the vehicle. The flow of air across the oil cooler lowers the temperature of the gear lubricant in the cooler, and the cooled lubricant is recycled back into the differential. The Downs and Baedke patents also teach remote cooling apparatus that is dependent upon the forward speed of vehicle travel to generate a flow of cooling air that lowers the operating temperature of lubricant.

The apparatus taught in these prior patents are limited in providing lubricant cooling because they are dependent upon the forward rate of vehicle travel, and they fail to provide sufficient cooling at slow vehicle speeds. They also completely fail to provide lubricant cooling when the vehicle is at a standstill.

Under heavy off-road conditions, where the terrain is extremely rough, operators of 4-wheel drive vehicles often drive at very slow rates of speed in order to navigate the various rough steep and rocky obstacles that they encounter. Such torturous operating conditions elevate the differential gear lubricants to very high temperatures above about 250° F. The prior patents teach apparatus that requires fast forward travel by the vehicle to generate an airflow for cooling a lubricant. The patents fail to recognize any problems associated with slow, off-road vehicle travel, and their teaching fails to even suggest a means to overcome such problems.

Various other patents disclose using fans or blowers to generate a flow of air to cool non-automotive mechanisms. For example, Jörg discloses an arrangement for cooling a gear case by means of a fan connected to the gear mechanism being cooled. The fan is attached directly to the power train of the transmission device and operates continuously while the gear mechanism is running. The patent completely fails to teach or even suggest providing means to selectively engage or disengage the fan in response to a need to cool. Such devices are unsuitable for automotive applications, and in particular, they are unsuitable for automotive use under frigid conditions. At sub-zero temperatures it is desirable to run vehicles at idle to warm up lubricants prior to actual vehicle operation. Under extreme frigid conditions, auxiliary heating is often supplied to vehicle parts to bring lubricants up to operating temperature. This practice avoids damaging tight fitting engine and transmission parts that would fail to have adequate lubrication with thick cold lubricants. An example of such auxiliary heating means is shown in the Brown patent that teaches attaching a heater to a differential housing in order to bring the gear lubricants up to operating temperature prior to vehicle start up.

SUMMARY OF THE INVENTION

Therefore the primary object of the disclosed invention is to provide a cooling apparatus that selectively provides a flow of cooling air across a vehicle housing containing a lubricant irrespective of whether the vehicle is in motion or at a standstill, and in particular it is directed to a means to selectively force a flow of cooling air across the exterior surface of a differential housing by providing a cast differential cover plate that includes an air duct arrangement extending along and communicating with the outside surface of the differential. One end of the air duct includes an intake manifold to receive and force air through the duct work, and the opposite end of the air duct includes a discharge to expel heated air away from the differential. A selectable fan is attached to the manifold end to force outside air into the manifold, through the duct work, and across the outside surface of the differential cover plate to remove heat from the differential. The fan motor is either manually or automatically operated in response to a temperature signal provided by a thermostat attached to the cover plate.

DETAILED DESCRIPTION OF THE PREFERRED EMBODIMENT

Referring to FIGS. 1–4, the preferred embodiment of the cooling apparatus is shown comprising a differential cover plate 1 having a cooling means for controlling the operating temperature of gear lubricant contained within a differential 2. In basic passenger car design, the drive train connects the transmission with the driving axles to transmit engine power to the driving wheels. The differential is a gear system that transfers power from the drive shaft 3 to the driving axles 4, and the gear system is engineered to permit one driving wheel to turn faster than the other wheel to prevent skidding on turns.

As heretofore mentioned, it is well known that under certain load conditions the operating temperature of the gear lubricant contained within a differential can be raised to undesirable high temperature levels where they lose their viscosity. This is especially true where the power train drives a 4-wheel vehicle. Therefore, it is desirable to provide means to maintain the gear lubricant at a relatively low operating temperature. For example, literature indicates that gear lubricants and motor oils begin to break down at temperatures ranges somewhere around 250° F. The longer lubricants stay at such elevated temperatures, whether the vehicle is in motion or at a standstill, the greater the deterioration of the lubricating properties of the oils. Therefore a cooling system that will effectively maintain a lubricant temperature below the critical 250° F. level must be capable of providing a cooling while the vehicle is in motion or at a standstill. The preferred embodiment of the lubricant cooling invention, shown in FIGS. 1–4, comprises a lubricant cooling apparatus that selectably provides a stream of cooling air across a differential cover plate to control the temperature of the gear lubricant contained within the differential housing. This is accomplished by providing a differential cover plate 1 that includes an air duct arrangement 5 for directing forced cooling air 6 across the outside surface 7 of the cover plate.

The preferred cooling apparatus comprises a differential cover plate 1 having an outer ring 8 that includes a surface 9 shaped for coupling to a like surface 10 provided on a differential housing 2. The outer ring 8 includes a bolt circle 11 having a plurality of spaced apart bolt holes 12 that correspond with threaded apertures 13 in housing 2. A shaped gasket 14 is positioned between surface 9 and surface 10, and bolts 15 extending through holes 12 and gasket 14, are threaded into apertures 13 to fasten the differential cover plate 1 to the differential housing 2.

The air duct arrangement 5 is either attached to or cast integral with the cover plate 1, and the cover plate and air duct arrangement are cast in a high conductive material such as aluminum to facilitate heat transfer away from the differential housing. The air duct includes an intake manifold 16 for receiving forced air, a fan like shaped top plate 17, side walls 18, and a plurality spaced apart internal of fins 19 that provide expanding air conduits 20 that radiate in an outward direction from the intake manifold 16 to an air discharge 21. The sidewalls 18 and the spaced apart internal fins 19 extend from the fan shaped top plate 17 inward through the differential cover plate 1 and communicate with the interior space 22 of differential housing 2 where the extended portions of the sidewalls and fins are immersed within the gear lubricant.

The cross-section of the airflow area A through A', along the radiating air conduits 20, increases continuously in an outward direction from the manifold 16 to the air discharge opening 21. This volumetric increase in conduit size causes the forced air to expand rapidly as it is forced outward through the conduits 20 and across the outer surface 7 of the cover plate. The rapid expansion of the air along the increasing conduit cross-section provides accelerated cooling along surfaces of the cover plate, fins 19 and sidewalls 18 when air is forced through the conduits.

The manifold end of the air duct arrangement 5 includes a motorized fan 24 attached to the manifold cover plate 25 with a heat insulating gasket or spacer between them. In the preferred embodiment, a fan having a 12 Volt D.C. motor capable of running at about 3100 RPM and delivering about 32 CFM of airflow was used to force air into manifold 16 and through the air conduits 20. However, it should be understood that any fan capable of delivering a volume of air that will maintain the lubricant temperature below about 250° F. may be used without departing from the scope of this invention.

The fan 24 provides means for forcing cooling air into the manifold 16 and down through the air conduits 20, where heat transfer from the differential to the cooling air takes place, and the heated air is expelled through the air discharged at the opening 21 located opposite the manifold 16.

An air filter is attached to the intake side of fan 24 to prevent dirt and debris from entering into and damaging the fan. The filter includes a housing 27 that holds a replaceable filter pad 26, and a removable screened cover 28 that prevents larger objects, such as stones from entering the filter housing and provides access for replacing dirty air filter pads 26.

Fan 24 is connected to a control switch, not shown, in the electrical system of the vehicle to permit an operator to selectively operate the fan as needed. A thermocouple 29, extending through cover plate 1 and into the differential housing 2, provides the operator with a temperature signal that indicates when the fan 24 should be selectively operated to force cooling air through the air duct arrangement to control lubricant temperature. Alternatively, the thermocouple may be wired to an automatic or programmable fan control switch to provide automatic cooling when the lubricant reaches a preselected temperature level and automatic shutdown when the lubricant temperature falls to a preselected temperature level.

Figure 1:
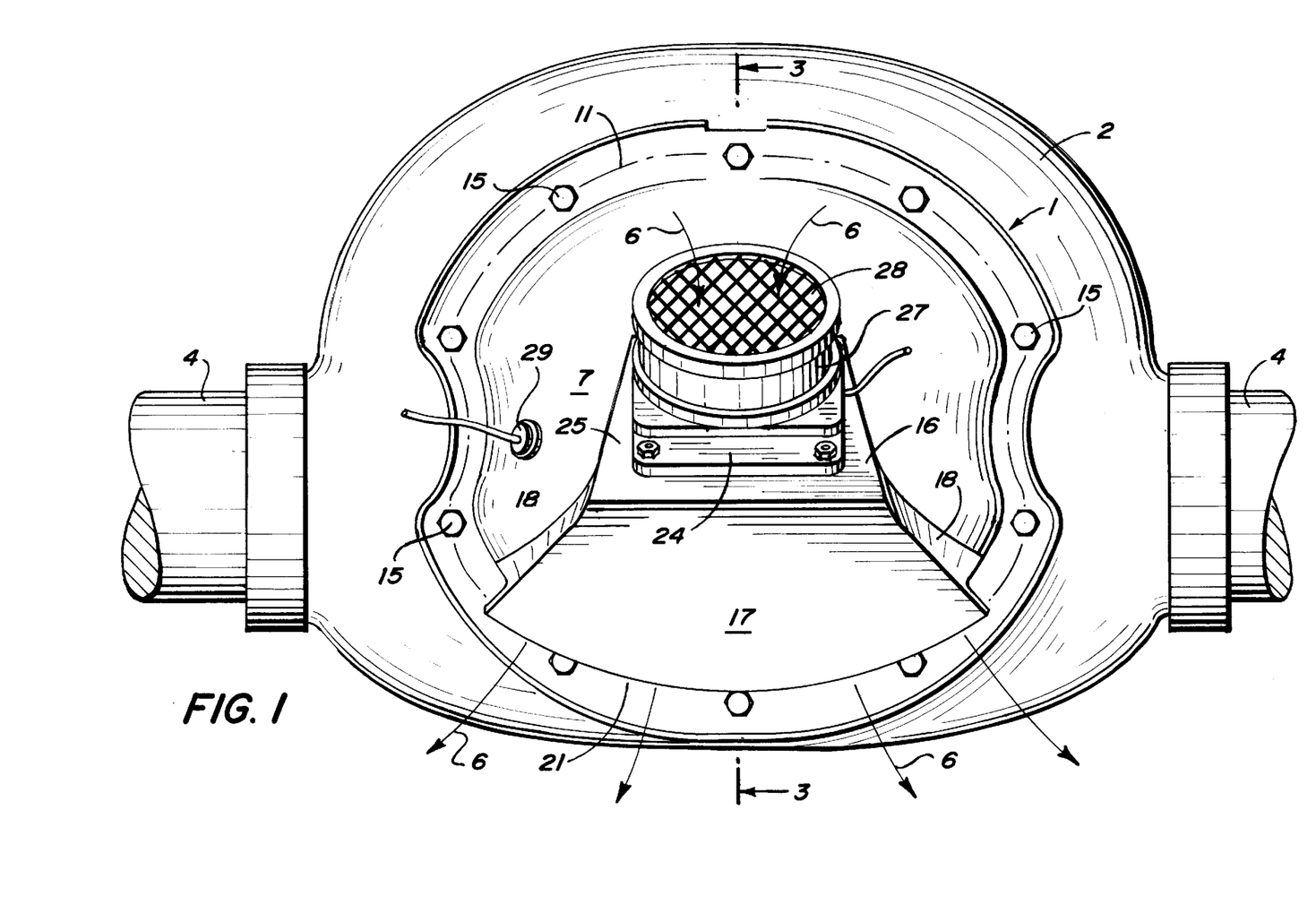
FIG. 1 is a front elevation of the preferred differential cover plate of the lubricant cooling invention.
Figure 2:
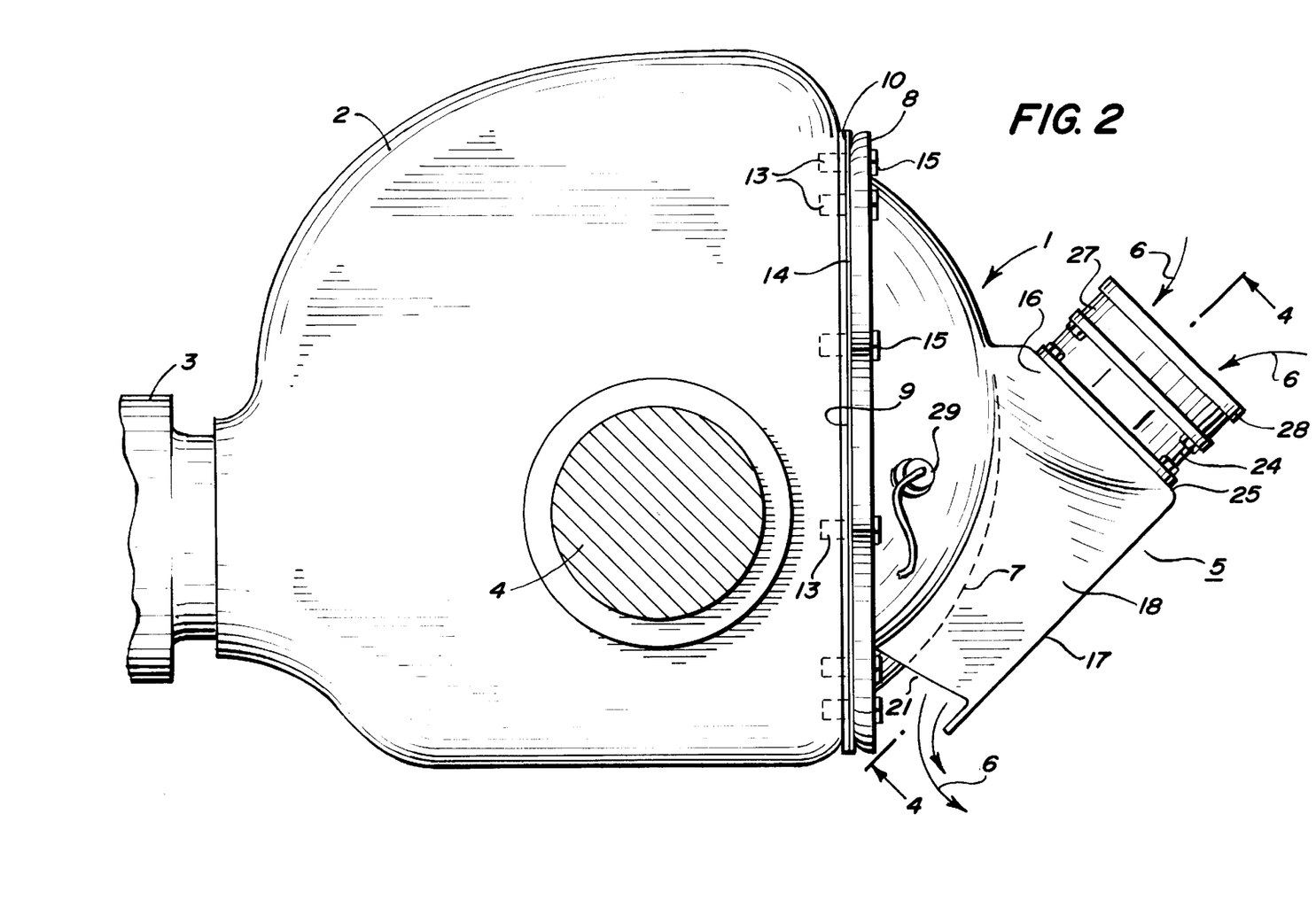
FIG. 2 is a side elevation showing the cooling apparatus shown in FIG. 1.
Figure 3:
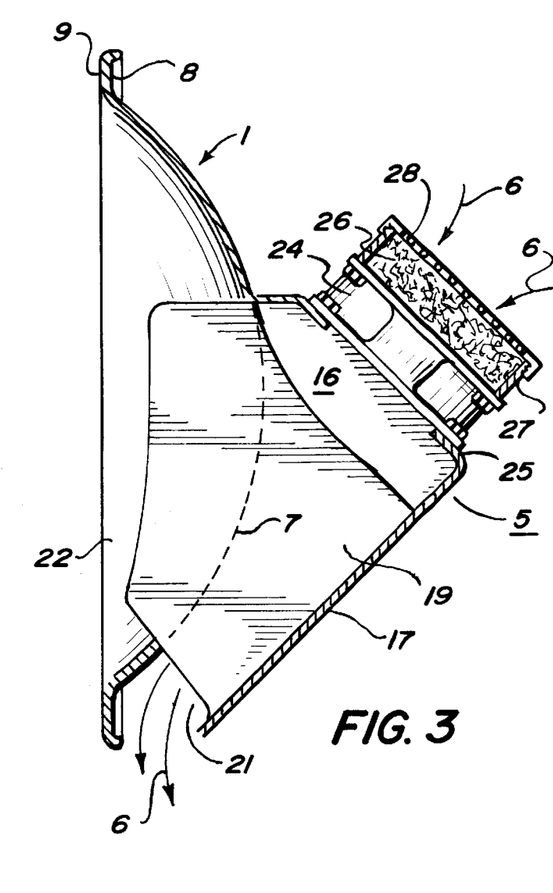
FIG. 3 is a cross-section view taken along the lines 3—3 of FIG. 1.
Figure 4:
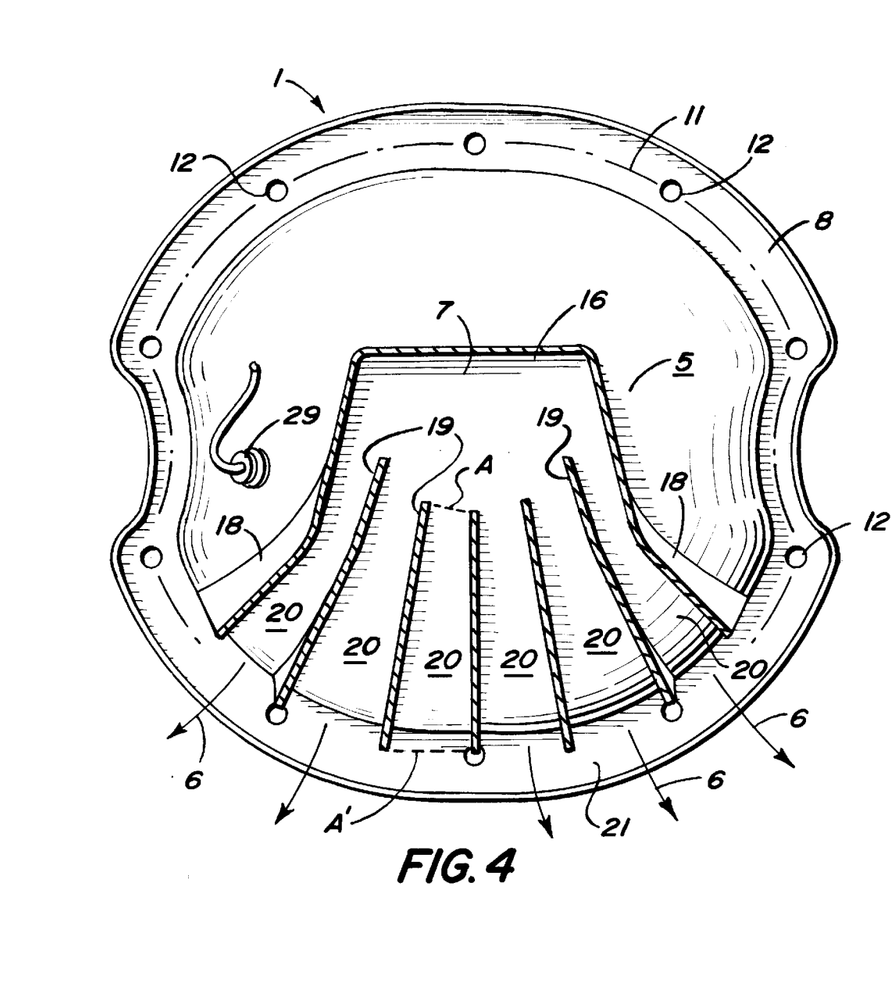
FIG. 4 is a cross-section view taken along the lines 4—4 of FIG. 2.
Figures 5, 6, 7:
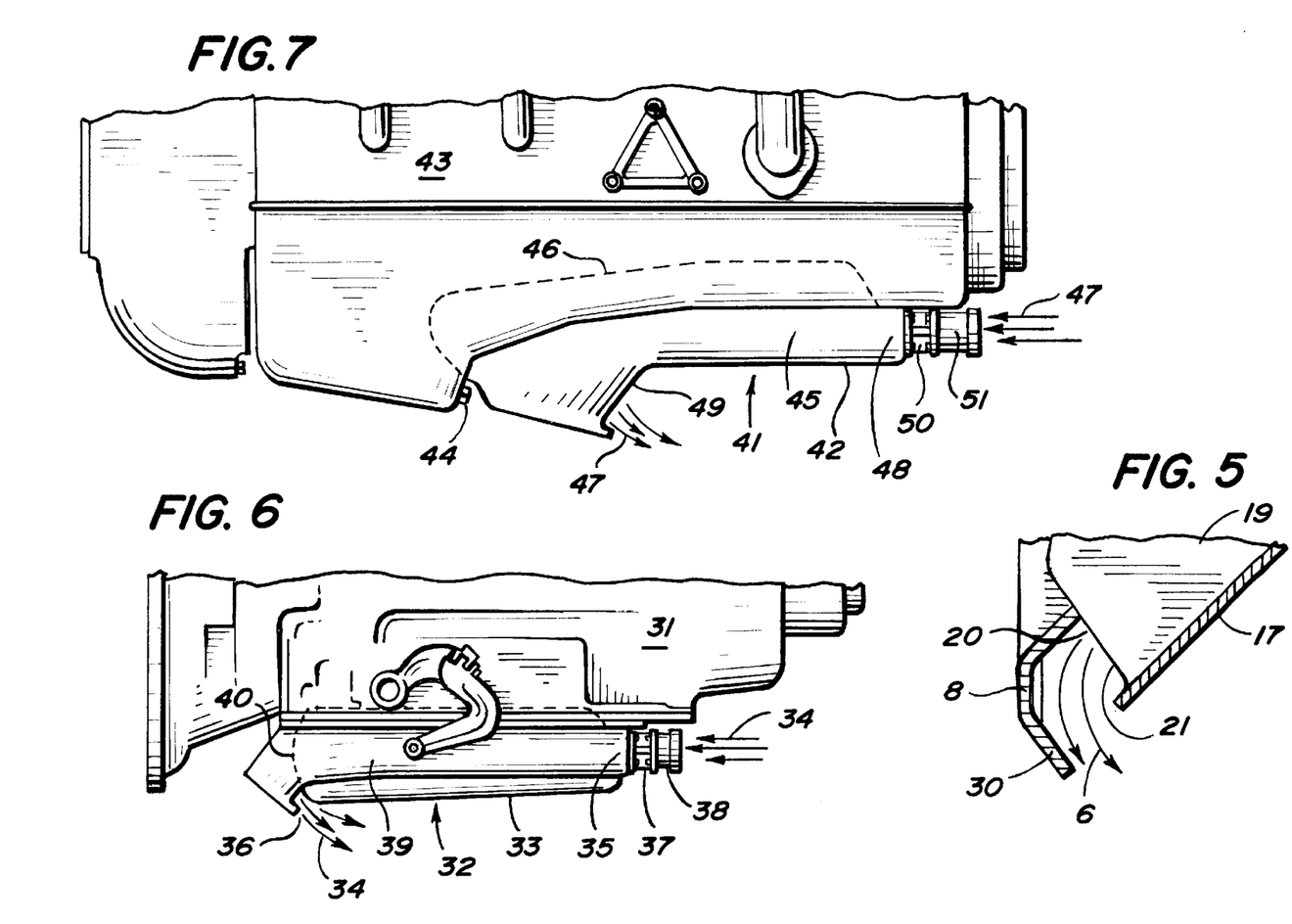
FIG. 5 is an fragmentary view showing an air discharge for the lubricant cooling invention.
FIG. 6 is a side elevation showing the cooling apparatus attached to a transmission housing.
FIG. 7 is a side elevation showing the cooling apparatus attached to an oil pan.

Referring to FIG. 5, the differential cover plate can include an extended lip portion 30 extending outward from the outer ring 8 and positioned below the air discharge 21. The lip provides a partial vacuum or low pressure area adjacent the opening 21, because of airflow caused by vehicle movement, and facilitates the discharge of air from the air conduits 20 and improves cooling by increasing the velocity of cooling airflow through the conduits.

It should be understood that the scope of the invention is not limited to the shape or configuration of the preferred embodiment shown in FIGS. 1–4, and it is not limited to controlling the temperature of a lubricant in a differential. Referring to FIG. 6 of the drawings, a transmission 31 is shown comprising a transmission cover plate 32 that includes an equivalent air duct arrangement 33 similar to the air duct arrangement 5 shown in FIGS. 1–4 except that the transmission cover plate 32, sidewalls 39 and internal fins 40 are shaped to conform to the dimensions of the transmission housing. The modified air duct arrangement 33 provides forced cooling air 34 through similar radiating air conduits that increase continuously in cross-section outward from the manifold 35 to the air discharge opening 36. A fan 37 is attached to the manifold 35 and a replaceable filter 38 prevents dirt and debris from damaging the fan. The fan is selectively operated by either a manual switch or thermostatically controlled automatic switch to force cooling air 34 through the internal air conduits. The sidewalls 39 and/or internal fins 40 extend through the transmission cover plate 32, as shown in the FIG. 3 cross-section for the differential cover plate 1, and are immersed into the transmission fluid to provide a heat sink cooling effect when the forced air system is operated.

Similarly, FIG. 7, shows an oil pan 41 having an air duct arrangement 42 attached to the underside of an automotive engine 43. The air duct arrangement is positioned to provide clearance for the oil drain plug 44 and includes sidewalls 45 and internal fins 46 that extend into the oil pan to be immersed within the crank case motor oil. The oil pan air duct arrangement 42 provides forced cooling air 47 through internal radiating air conduits that are formed by the sidewalls 45 and internal fins 46. The oil pan air conduits also increase continuously in cross-section outward from a manifold portion 48 to the air discharge opening 49 to provide accelerated cooling of the motor oil. A fan 50 is attached to the manifold 48 and a replaceable filter 51 prevents dirt and debris from damaging the fan. The fan is selectively operated by either a manual switch or a thermostatically controlled automatic switch to force cooling air 47 through the internal air conduits in the air duct arrangement 42.

Figure 8:
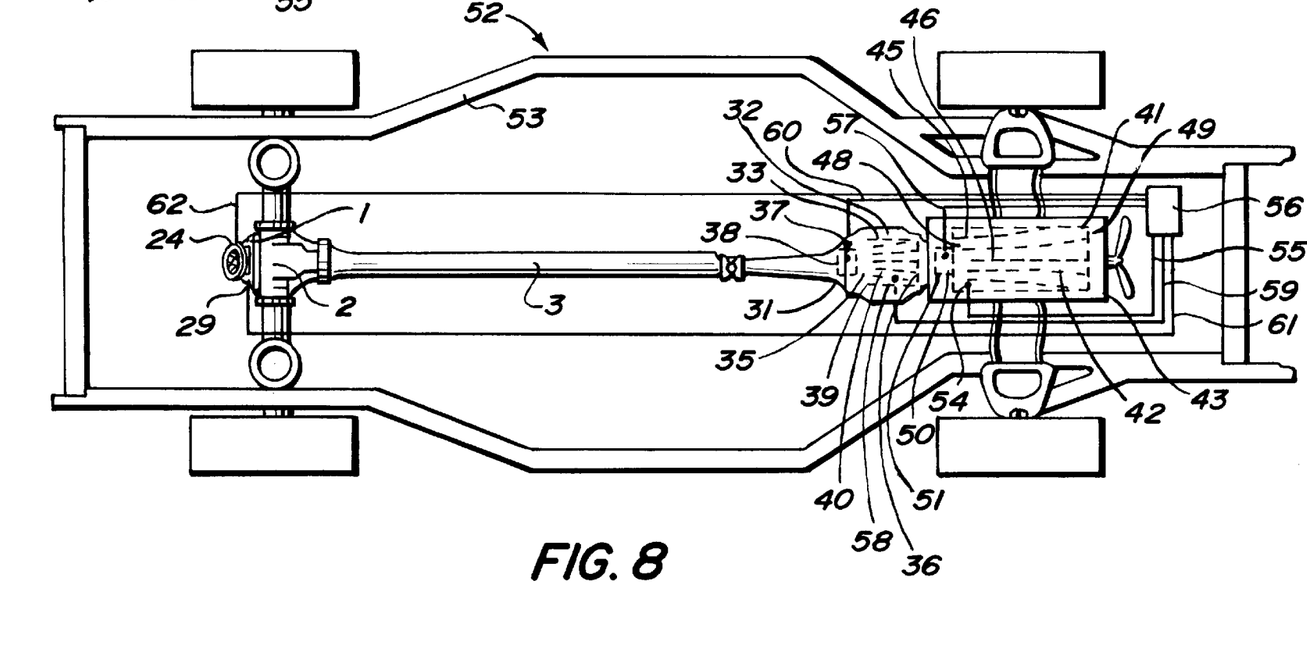
FIG. 8 is a schematic diagram showing a unified automotive cooling system.

The above equivalent cooling apparatus may be combined into a unified cooling system that controls the temperature of different lubricants used in an automotive type vehicle. Referring to FIG. 8, showing a schematic drawing of an automotive undercarriage 52 comprising a frame 53, that supports the engine 43, transmission 31 differential 2 and the drive shaft 3 extending between the transmission and differential.

The oil pan 41, having the heretofore described air duct arrangement 42, is fastened to engine 43. The air duct arrangement includes a fan 50 and filter arrangement 51 that forces cooling air through the internal radiating air conduits formed by the sidewalls 45 and internal fins 46. The air conduits have a continuously increasing air conduit cross-section from the manifold 48 to the air discharge opening 49. A thermocouple 54 extends through the oil pan 41 to monitor the lubricant temperature in the engine crank case, and thermocouple 54 is connected by line 55 to an electrical circuit that either provides a temperature signal to automatically operate the cooling fan 50 by sending an electrical signal to a programmable automatic switch 56 that operates fan 50 via line 57. Switch 56 can be programmed to operate the fan in response to maximum and minimum temperature signals received from thermocouple 54.

A transmission cover plate 32 that includes the above disclosed air duct arrangement 33 is attached to transmission 31. The transmission cover plate includes a fan 37 and replaceable filter 38 that forces cooling air through the internal radiating air conduits formed by the sidewalls 39 and internal fins 40. The air conduits have a continuously increasing air conduit cross-section from the manifold 35 to the air discharge opening 36. A thermocouple 58 extends through the transmission cover plate 32 to monitor the temperature of the transmission fluid, and thermocouple 58 is connected by line 59 to the programmable switch 56 to operate fan 37 via line 60 in response to maximum and minimum temperature signals received from thermocouple 58.

A differential cover plate 1, having an air duct arrangement as described above in FIGS. 1–4, is fastened to the differential 2 to control the temperature of the gear lubricant contained in the differential housing. Line 61 connects the differential thermocouple 29 to the programmable switch 56 to operate fan 24 via line 62 in response to maximum and minimum temperature signals received from thermocouple 29.

Figure 9:
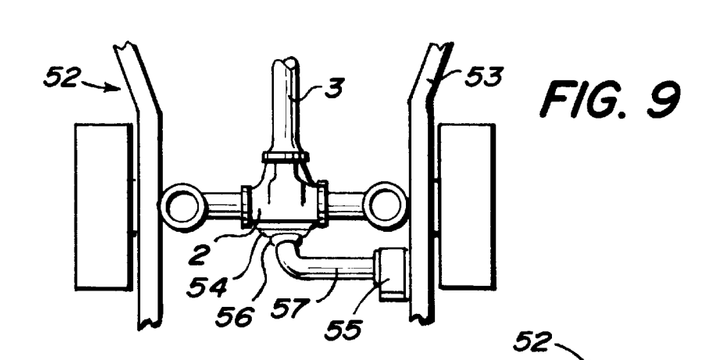
FIG. 9 is a schematic diagram showing an alternate differential cover plate spaced apart from the fan that provides cooling air.

In instances where the undercarriage space constraints of a vehicle prevent using a cover plate having a contiguous fan, as described and shown in FIGS. 1–4, the cooling fan may be attached to the vehicle at a location distant from the cover plate. For example, referring to FIG. 9, a differential 2 is shown connected to a drive shaft 3 of a vehicle having such undercarriage space constraints. In this instance, a differential cover plate 54, similar to the cover plate of the preferred embodiment, is attached to differential 2. The cooling fan 55 is attached to the frame 53, or other component of undercarriage 52, and an air conduit or duct 57 is attached to both the air discharge end of fan 55 and the cover plate manifold 56 to provide means for directing forced air from the fan and into the cover plate air duct arrangement In such instances where the fan is located remote from the cover plate 54, the fan capacity is increased to provide a greater volume of airflow than disclosed for the preferred embodiment.

While this invention has been described as having a preferred design, it is understood that it is capable of further modifications, uses, and/or adaptations following in general the principle of the invention and including such departures from the present disclosure as come within known or customary practice in the art to which the invention pertains, and as may be applied to the essential features set forth herein, and fall within the scope of the invention limited by the appended claims.

I claim:

1. Apparatus for controlling temperature of a lubricant contained within a housing, comprising:

a) a cover plate attached to the housing, said cover plate including an air duct arrangement comprising;
   i) an intake manifold,
   ii) a discharge, and
   iii) at least one air conduit extending between said intake manifold and said discharge, said at least one air conduit defined by an assembly that includes an outside surface portion of said cover plate; and
 b) a fan positioned to force air into said manifold whereby said fan provides:
   i) an airflow feed into said at least one air conduit, said airflow feed forced to communicate with said outside surface portion that defines said at least one air conduit to cause a heat transfer from the housing to said airflow feed, and
   ii) an airflow exhaust from said discharge, said airflow exhaust expelling air heated by said heat transfer from the housing to said airflow feed to control the temperature of the lubricant contained in the housing.

2. The apparatus recited in claim 1 wherein the housing is a differential housing and said cover plate is a differential cover plate attached to the differential housing.

3. The apparatus recited in claim 2 wherein said air duct arrangement comprises:
   a) a first sidewall and a second sidewall extending from said intake manifold to said discharge; and
   b) a top plate extending between said first sidewall and said second sidewall from said intake manifold to said discharge, said first and second sidewalls and said top plate providing said at least one air conduit.

4. The apparatus recited in claim 3 wherein said first and second sidewalls extend radially outward from said intake manifold to said discharge to provide an air conduit having an increasing airflow cross-section from said intake manifold to said discharge.

5. The apparatus recited in claim 4 wherein said air duct arrangement includes at least one fin attached to said top plate and positioned between said first sidewall and said second sidewall, said at least one fin extending between said intake manifold and said discharge to provide at least two air conduits having an increasing airflow cross-section from said intake manifold to said discharge.

6. The apparatus recited in claim 5 wherein said at least one fin extends through said differential cover plate and communicates with an interior space portion of the differential housing.

7. The apparatus recited in claim 5 wherein said first sidewall and said second sidewall extend through said differential cover plate and communicates with an interior space portion of the differential housing.

8. The apparatus recited in claim 2 wherein said differential cover plate includes a lip extending outward from said differential cover plate adjacent said discharge to a location below said discharge.

9. The apparatus recited in claim 2 wherein said air duct arrangement includes a filter means upstream of said intake manifold.

10. The apparatus recited in claim 2 wherein said fan is manually operated in response to a temperature signal.

11. The apparatus recited in claim 2 wherein said fan is automatically operated in response to a temperature signal.

12. The apparatus recited in claim 1 wherein the housing is a transmission housing and said cover plate is a transmission cover plate attached to the transmission housing.

13. The apparatus recited in claim 12 wherein said air duct arrangement comprises:
   a) a first sidewall and a second sidewall extending from said intake manifold to said discharge; and
   b) a top plate extending between said first sidewall and said second sidewall from said intake manifold to said discharge, said first and second sidewalls and said top plate providing said at least one air conduit.

14. The apparatus recited in claim 13 wherein said first and second sidewalls extend radially outward from said intake manifold to said discharge to provide an air conduit having an increasing airflow cross-section from said intake manifold to said discharge.

15. The apparatus recited in claim 14 wherein said air duct arrangement includes at least one fin attached to said top plate and positioned between said first sidewall and said second sidewall, said at least one fin extending between said intake manifold and said discharge to provide at least two air conduits having an increasing airflow cross-section from said intake manifold to said discharge.

16. The apparatus recited in claim 15 wherein said at least one fin extends through said transmission cover plate and communicates with an interior space portion of the transmission housing.

17. The apparatus recited in claim 15 wherein said first sidewall and said second sidewall extend through said transmission cover plate and communicates with an interior space portion of the transmission housing.

18. The apparatus recited in claim 12 wherein said transmission cover plate includes a lip extending outward from said transmission cover plate adjacent said discharge to a location below said discharge.

19. The apparatus recited in claim 12 wherein said air duct arrangement includes a filter means upstream of said intake manifold.

20. The apparatus recited in claim 12 wherein said fan is manually operated in response to a temperature signal.

21. The apparatus recited in claim 12 wherein said fan is automatically operated in response to a temperature signal.

22. The apparatus recited in claim 1 wherein the housing is an engine block and said cover plate is an oil pan attached to the engine block.

23. The apparatus recited in claim 22 wherein said air duct arrangement comprises:
   a) a first sidewall and a second sidewall extending from said intake manifold to said discharge; and
   b) a top plate extending between said first sidewall and said second sidewall from said intake manifold to said discharge, said first and second sidewalls and said top plate providing said at least one air conduit.

24. The apparatus recited in claim 23 wherein said first and second sidewalls extend radially outward from said intake manifold to said discharge to provide an air conduit having an increasing airflow cross-section from said intake manifold to said discharge.

25. The apparatus recited in claim 24 wherein said air duct arrangement includes at least one fin attached to said top plate and positioned between said first sidewall and said second sidewall, said at least one fin extending between said intake manifold and said discharge to provide at least two air conduits having an increasing airflow cross-section from said intake manifold to said discharge.

26. The apparatus recited in claim 25 wherein said at least one fin extends through said oil pan and communicates with an interior space portion of the engine block.

27. The apparatus recited in claim 25 wherein said first sidewall and said second sidewall extend through said oil pan and communicates with an interior space portion of the engine block.

28. The apparatus recited in claim 22 wherein said oil pan includes a lip extending outward from said oil pan adjacent said discharge to a location below said discharge.

29. The apparatus recited in claim 22 wherein said air duct arrangement includes a filter means upstream of said intake manifold.

30. The apparatus recited in claim 22 wherein said fan is manually operated in response to a temperature signal.

31. The apparatus recited in claim 22 wherein said fan is automatically operated in response to a temperature signal.

32. The apparatus recited in claim 1 wherein said cover plate and said air duct arrangement is cast aluminum.

33. Apparatus for controlling temperature of lubricants in an automotive vehicle, comprising:
   a) a differential cover plate attached to a differential housing and having an outside surface that includes an air duct arrangement, said air duct arrangement having;
      i) an intake manifold,
      ii) a discharge, and
      iii) at least one air conduit extending between said intake manifold and said discharge, said at least one air conduit communicating with said outside surface of said cover plate; and iv) a fan having means to selectively force air into said manifold to create an airflow along said at least one air conduit that communicates with said outside surface of said cover plate, said airflow cooling said cover plate to control the lubricant temperature, said airflow being expelled at said discharge;

b) a transmission cover plate attached to a transmission housing and having an outside surface that includes an air duct arrangement, said air duct arrangement having;
  i) an intake manifold,
  ii) a discharge, and
  iii) at least one air conduit extending between said intake manifold and said discharge, said at least one air conduit communicating with said outside surface of said cover plate; and
  iv) a fan having means to selectively force air into said manifold to create an airflow along said at least one air conduit that communicates with said outside surface of said cover plate, said airflow cooling said cover plate to control the lubricant temperature, said airflow being expelled at said discharge.

c) an oil pan attached to an engine block and having an outside surface that includes an air duct arrangement, said air duct arrangement having;
  i) an intake manifold,
  ii) a discharge, and
  iii) at least one air conduit extending between said intake manifold and said discharge, said at least one air conduit communicating with said outside surface of said cover plate; and
  iv) a fan having means to selectively force air into said manifold to create an airflow along said at least one air conduit that communicates with said outside surface of said cover plate, said airflow cooling said cover plate to control the lubricant temperature, said airflow being expelled at said discharge.

34. The apparatus recited in claim 33 wherein each said air duct arrangement of said differential cover plate, said transmission cover plate and said oil pan comprises:

a) a first sidewall and a second sidewall extending from said intake manifold to said discharge; and b) a top plate extending between said first sidewall and said second sidewall from said intake manifold to said discharge, said first and second sidewalls and said top plate providing said at least one air conduit.

35. The apparatus recited in claim 34 wherein each said first and second sidewall extends radially outward from each said intake manifold to each said discharge to provide an air conduit having an increasing airflow cross-section from each said intake manifold to each said discharge.

36. The apparatus recited in claim 35 wherein each said air duct arrangement includes at least one fin attached to each said top plate and positioned between said first sidewall and said second sidewall, each said at least one fin extending between each said intake manifold and each said discharge to provide at least two air conduits having an increasing airflow cross-section from each said intake manifold to each said discharge.

37. The apparatus recited in claim 36 wherein each said at least one fin extends through its respective said cover plate and communicates with an interior space portion of its respective differential housing, transmission housing and engine block.

38. The apparatus recited in claim 36 wherein each said first sidewall and each said second sidewall extends through its respective said cover plate and communicates with an interior space portion of its respective differential housing, transmission housing and engine block.

39. The apparatus recited in claim 33 wherein each said air duct arrangement includes a filter means upstream of each said intake manifold.

40. The apparatus recited in claim 33 wherein each said fan is manually operated in response to a temperature signal.

41. The apparatus recited in claim 33 wherein said each fan is automatically operated in response to a temperature signal.

42. A method for controlling temperature of a lubricant contained in a housing, the steps of the method comprising:
  a) providing an air duct arrangement having;
    i) an intake manifold,
    ii) a discharge, and
    iii) at least one air conduit extending between said intake manifold and said discharge, said at least one air conduit communicating with an outside surface of the housing;
  b) forcing air into said intake manifold in response to a temperature measurement of the lubricant contained in the housing;
  c) creating an airflow through said at least one air conduit, said airflow communicating with the outside surface of the housing to cause a heat transfer from the housing to said air; and
  d) expelling at said discharge said air heated by said heat transfer to control the temperature of the lubricant contained in the housing.

43. The method according to claim 42 comprising the further step:
  a) expanding said air within said at least one air conduit to provide accelerated cooling along said airflow.

44. The method according to claim 42 wherein said housing is a differential housing.

45. The method according to claim 42 wherein said housing is a transmission housing.

46. The method according to claim 42 wherein said housing is an engine block.

47. The method according to claim 42 wherein said air duct arrangement is an aluminum casting attached to the housing.

48. The apparatus recited in claim 1 wherein said fan is spaced apart form said cover plate and an air conduit extends between said fan and said intake manifold to provide means for said fan to force air into said intake manifold.

* * * * *